United States Patent [19]

Brown, deceased

[11] 3,853,966

[45] Dec. 10, 1974

[54] N-CHLOROTHIO UREAS

[76] Inventor: Melancthon S. Brown, deceased, late of 671 Spruce St., Berkeley, Calif. 94707 by Gustave K. Kohn, administrator

[22] Filed: May 8, 1972

[21] Appl. No.: 250,907

Related U.S. Application Data

[63] Continuation-in-part of Ser. Nos. 88,212, Nov. 9, 1970, Pat. No. 3,755,437, and Ser. No. 189,732, Oct. 15, 1971.

[52] U.S. Cl...... 260/545 R, 260/453 R, 260/553 A, 260/553 R, 71/98, 71/100
[51] Int. Cl........................................... C07c 155/02
[58] Field of Search...................................... 260/545

[56] References Cited

FOREIGN PATENTS OR APPLICATIONS 2,045,440   3/1972   Germany ............................ 260/545

*Primary Examiner*—Robert Gerstl
*Attorney, Agent, or Firm*—G. F. Magdeburger; John Stoner, Jr.; Raymond Owyang

[57] ABSTRACT

N-chlorothio ureas are produced by the reaction of sulfur dichloride and an urea having at least one hydrogen substituted on an urea nitrogen atom in the presence of an acid acceptor. The N-chlorothio ureas are useful intermediates in the preparation of pesticides.

2 Claims, No Drawings

N-CHLOROTHIO UREAS

CROSS REFERENCE TO RELATED APPLICATIONS

This application is a continuation-in-part of U.S. Ser. No. 88,212, filed Nov. 9,1970, now U.S. Pat. No. 3,755,437 and U.S. Ser. No. 189,732, filed Oct. 15, 1971.

DESCRIPTION OF THE PRIOR ART

N-chlorothio-N,N',N'-trimethylurea is a known compound which is prepared by the reaction of a N-silylated urea and sulfur dichloride, as disclosed by E. Kuhle, Synthesis, 11, 573 (1970).

Processes for producing sulfenyl chloride derivatives of compounds having active hydrogen atoms substituted on nitrogen are also known. E. Kuhle, Synthesis, 561 (1970), discloses the preparation of sulfenyl halide derivatives of sulfoamides and amines. U.S. Ser. No. 45,902 of G. K. Kohn, filed June 12, 1970, discloses the preparation of sulfenyl halide derivatives of amides.

DESCRIPTION OF THE INVENTION

The N-chlorothio ureas of the invention are represented by the formula (I):

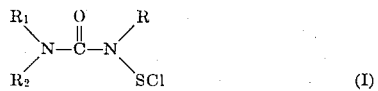

(I)

wherein R is hydrogen or alkyl of one to six carbon atoms, cycloalkyl of three to 10 carbon atoms, aryl of six to 10 carbon atoms optionally substituted with 1 to 4 halogens of atomic number 9 to 35 (fluorine, chlorine, or bromine), trihalomethyl groups wherein the halogen is fluorine or chlorine, nitro groups, or alkoxy groups individually of one to four carbon atoms; $R^1$ and $R^2$ independently are R or alkoxy of one to four carbon atoms such as methoxy, ethoxy, propoxy, etc. R may also be alkoxy of one to four carbon atoms, especially methoxy.

Representative alkyl groups which R, $R^1$ and $R^2$ may represent include methyl, ethyl, n-propyl, isopropyl, n-butyl t-butyl, n-pentyl and n-hexyl. The preferred alkyl group is methyl.

Representative cycloalkyl groups which R, $R^1$ and $R^2$ may represent include monocyclic groups such as cyclopropyl, cyclopentyl, cyclohexyl, 2-methylcyclohexyl, 4-methylcyclohexyl, cycloheptyl, and cyclooctyl; and bicyclic groups such as bicyclo[3.2.0] heptyl, bicyclo[2.2.1] heptyl, bicyclo[3.3.0] octyl, bicyclo[4.2.0] octyl, bicyclo[3.3.0] octyl, and bicyclo[3.2.1] octyl. Cycloalkyl groups preferably are monocyclic groups having five to six carbon atoms.

Representative hydrocarbyl aryl groups which R, $R^1$ and $R^2$ may represent include phenyl; naphthyl; alkaryl of 7 to 10 carbon atoms such as 2-methylphenyl, 3-methylphenyl, 4-ethylphenyl, 2,4-dimethylphenyl, 3,4-dimethylphenyl, 3-sec-butylphenyl; and aralkyl of seven to 10 carbon atoms such as benzyl, 3-phenylpropyl, and 4-phenylbutyl.

Representative substituted aryl groups which R, $R^1$ and $R^2$ may represent include halo-substituted aryl groups such as 2-fluorophenyl, 4-fluorophenyl, 2-chlorophenyl, 3-chlorophenyl, 3,4-dichlorphenyl, 4-trifluoromethylphenyl, 3-chloro-4-bromophenyl, 2-chloro-4-methylphenyl, 2-fluoro-4-methylphenyl, 4-chlorobenzyl, 4-fluorobenzyl, 2-(2-fluorophenyl)ethyl; alkoxy-substituted aryl groups such as 4-methoxyphenyl, 4-ethoxyphenyl, 4-methoxy-2-methylphenyl, 4-methoxybenzyl; nitro-substituted aryl groups such as 2-nitrophenyl, 4-nitrophenyl and 4-nitrobenzyl; and aryl groups substituted with different substituents such as 2-methoxy-4-chlorophenyl and 2-chloro-4-nitrophenyl. Substituted aryl groups preferably have one to two substituents. Preferred substituted aryl groups are halo-substituted phenyls, especially those having 1 to 2 fluorine or chlorine substituents.

Preferably R is alkyl of 1 to 2 carbon atoms, especially methyl.

Preferably $R^1$ is phenyl or phenyl substituted with 1 to 2 halogens of atomic number 9 to 35 (fluorine or chlorine), trifluoromethyl groups, nitro groups, alkyl of one to two carbon atoms, or alkoxy of one to two carbon atoms.

$R^2$ is preferably hydrogen or alkyl of one to two carbon atoms, more preferably methyl. The preferred $R^2$ group is hydrogen.

Representative N-chlorothio ureas of formula I are: N-chlorothio urea, N-chlorothio-N-methyl urea, N-chlorothio-N,N'-dimethyl urea, N-chlorothio-N-methyl-N',N'-dimethyl urea, N-chlorothio-N-methyl-N'-cyclohexyl-N'-methyl urea, N-chlorothio-N-cyclopentyl-N',N'-diethyl urea, N-chlorothio-N'-methyl-N,N'-dimethoxy urea, N-chlorothio-N-(2-norbornyl)-N'-phenyl urea, N-chlorothio-N-butyl-N'-benzyl urea, N-chlorothio-N-(2-methylcyclohexyl)-N'-phenyl urea, N-chlorothio-N-methyl-N'-(2-fluorophenyl) urea, N-chlorothio-N-methyl-N'-(3,4-dichlorophenyl) urea, N-chlorothio-N-(3-trifluoromethylphenyl)-N',N'-dimethyl urea, N-chlorothio-N-phenyl-N',N'-dimethyl urea, N-chlorothio-N-(3,4-dichlorophenyl)-N'-methoxy-N'-methyl urea, N-chlorothio-N-(3-chloro-4-bromophenyl)-N'-methoxy-N'-methyl urea, N-chlorothio-N'-(4-bromophenyl)-N,N'-dimethoxy urea, N-chlorothio-N-(4-chlorophenyl)-N',N'-dimethyl urea, N-chlorothio-N-(3,4-dichlorophenyl)-N'-methyl-N'-butyl urea, N-chlorothio-N-(hexahydro-4,7-methanoinden-5-yl)-N',N'-dimethyl urea, N-chlorothio-N-(2-fluorophenyl)-N'-phenyl-N'-methyl urea, N-chlorothio-N-(2-fluorophenyl)-N'-benzyl-N'-methyl urea, N-chlorothio-N-(2-fluorophenyl)-N'-methyl-N'-propyl urea, N-chlorothio-N-(2-fluorophenyl)-N'-(2-fluorphenyl)-N'-methyl urea, N-chlorothio-N-methyl-N'-(4-nitrophenyl)-N'-methyl urea, N-chlorothio-N-methyl-N'-(4-methoxyphenyl)-N'-methyl urea, N-chlorothio-N-(3,4-dichlorophenyl)-N',N'-dimethyl urea, N-chlorothio-N-(2-fluorophenyl)-N',N'-dimethyl urea, N-chlorothio-N-(4-methoxybenzyl)-N',N'-dimethyl urea, and N-chlorothio-N-(2-methylphenyl)-N',N'-dimethyl urea.

The N-chlorothio ureas are prepared in accordance with the following reaction (1):

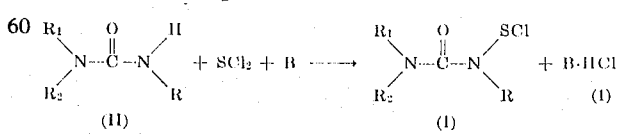

wherein R, $R^1$ and $R^2$ have the same significance as previously defined and B is an acid acceptor.

The acid acceptor is an organic base such as a pyridine compound or a trialkylamine compound. Suitable pyridine compounds are pyridine and pyridine compounds of six to 10 carbon atoms and of 1 to 2 alkyl groups such as 2-methylpyridine, 2-ethylpyridine, 3-methylpyridine, 3,5-dimethylpyridine, and 2-butylpyridine. Suitable trialkylamines are those wherein the alkyl group contains individually one to four carbon atoms, such as trimethylamine, triethylamine, tripropylamine and tributylamine.

Generally, commercially available sulfur dichloride of reasonable purity, e.g., greater than 90–98 percent purity, is suitably employed. The suflur dichloride may contain small amounts of an inhibitor such as tributylphosphate or triethylphosphate.

The sulfur dichloride and the urea compound are employed in substantially equimolar amounts, e.g., the molar ratio of sulfur dichloride to the urea compound generally varies from about 1.5:1 to 1:1.5, although molar ratios of sulfur dichloride to the urea compound of 1.4:1 to 1.1:1 are preferred. The molar ratios of acid acceptor to sulfur dichloride is also substantially equimolar, e.g., the molar ratio of acid acceptor to sulfur dichloride varies from about 1.2:1 to 1:1.2, although molar ratios of acid acceptor to sulfur dichloride of 1:1 to 1:1.2 are preferred.

In general, the reaction is accomplished by reacting the urea and the sulfur dichloride in the presence of the acid acceptor compound in an inert diluent. The reaction is suitably conducted by adding the sulfur dichloride to a mixture of the urea and the acid acceptor in an inert diluent. Alternatively, the reaction is conducted by adding a mixture of the urea and acid acceptor to a solution of the sulfur dichloride in an inert diluent. However, the preferred method for conducting the reaction comprises reacting the urea and sulfur dichloride in the presence of a limited amount of free uncomplexed acid acceptor. This is suitably accomplished by the addition of the acid acceptor to a substantially equimolar mixture of the urea and the sulfur dichloride so that the moles of free acid acceptor to the total moles of urea reactant and N-chlorothio urea product is less than 0.2:1, preferably less than 0.1:1, and more preferably less than 0.05:1. In other words, during the course of the reaction between the sulfur dichloride and the urea reactant, there should be at least 5 moles of the urea reactant and the N-chlorothio urea product per mole of acid accpetor which is not complexed with hydrochloric acid. Provided that the reaction is conducted with the restricted amount of acid acceptor indicated above, the contacting of the acid acceptor with the mixture of the urea and the sulfur dichloride can be conducted by a variety of procedures. In one modification, the acid acceptor is added in increments, e.g., dropwise, in an inert diluent, if desired, to a mixture of the urea and sulfur dichloride in an inert diluent. In another modification, the acid acceptor is added continuously to a mixture of the urea and sulfur dichloride in an inert diluent.

Suitable inert diluents for the reaction include alkanes of five to 10 carbon atoms, such as hexane, isooctane and decane; aromatic compounds such as benzene and chlorobenzene; oxygenated hydrocarbons such as acyclic alkyl ethers, e.g., dimethoxyethane and dibutyl ether; and cycloalkyl ethers, e.g., dioxane, tetrahydrofuran and tetrahydropyran. Other suitable diluents include nitriles such as acetonitrile and propionitrile; dialkylamide such as dimethylformamide and dialkylsulfoxides such as dimethylsulfoxide. Preferred diluents are chlorinated hydrocarbons of one to two carbon atoms, such as methylene dichloride chloroform, carbon tetrachloride and ethylene dichloride. Generally, the amount of diluent employed ranges from 1 to 50 moles per mole of sulfur dichloride.

The reaction is suitably conducted at a temperature between −20°C. and the boiling point of the diluent, although temperatures between 0°C. and 50°C. are preferred. The reaction is conducted at or above atmospheric pressure.

It is appreciated, of course, that the N-chlorothio urea product of the invention is formed by the subsitution of a hydrogen substituent on an urea nitrogen atom by a sulfenyl chloride group. When the urea reactant has more than one hydrogen substituted on an urea nitrogen, a mixture of monochlorothio derivatives is therefore generally formed (unless the urea reactant is symmetrical, i.e., one $R^1$ or $R^2$ is hydrogen and the other $R^1$ or $R^2$ is the same as R). However, it has been found that when one R, $R^1$ or $R^2$ group is alkyl, the urea compound is preferentially sulfenylated at the nitrogen atom bearing the alkyl group.

The preparation of the N-chlorothio ureas of the invention is illustrated by the following examples.

EXAMPLE 1

Preparation of
N-chlorothio-N-methyl-N'-2-fluorophenyl urea

A 5.7 g (0.055 mole) sample of sulfur dichloride was added dropwise to a mixture of 8.4 g (0.05 mole) N-methyl-N'-2-fluorophenylurea and 4.7 g (0.06 mole) pyridine in 50 ml methylene chloride cooled in an ice bath. After the completion of the addition, the pyridine hydrochloride formed during the reaction was filtered. Hexane was added to the filtrate to precipitate some additional pyridine hydrochloride, which was removed by filtration. Evaporation of the resulting filtrate gave a clear red oil. The nuclear magnetic resonance spectrum of the oil showed a N-methyl singlet at 3.5 ppm (relative to tetramethylsilane). Elemental analysis showed:

|   | Calc. | Found |
|---|---|---|
| S % | 13.6 | 13.6 |
| Cl % | 15.1 | 15.4 |

EXAMPLE 2

Preparation of
N-chlorothio-N-(3,4-dichlorophenyl)-N',N'-dimethyl urea

A 5.7 g (0.055 mole) sample of sulfur dichloride was added dropwise to a mixture of 11.7 g (0.05 mole) of N-(3,4-dichlorophenyl)-N',N'-dimethyl urea and 4.7 g (0.06 mole) pyridine in 50 ml methylene chloride cooled in an ice bath. After the completion of the addition, the pyridine hydrochloride was filtered. Hexane was added to precipitate additional pyridine hydrochloride, which was removed by filtration. Evaporation of the resulting filtrate gave the product as a clear yellow oil. The nuclear magnetic resonance spectrum showed a N',N'-dimethyl singlet at 3.0 ppm (relative to tetramethylsilane). Elemental analysis showed:

|   | Calc. | Found |
|---|---|---|
| S % | 10.7 | 10.7 |
| Cl % | 35.6 | 35.4 |
| C % | 36.1 | 36.4 |
| H % | 3.0 | 3.2 |
| N % | 9.3 | 8.7 |

EXAMPLE 3

Preparation of N-chlorothio-N-methyl-N'-3,4-dichlorophenyl urea

A 9.48 g (0.12 mole) sample of pyridine was added dropwise to a slurry of 21.9 (0.1 mole) N-methyl-N'-(3,4-dichlorophenyl) urea and 11.3 g (0.11 mole) sulfur dichloride in 100 ml methylene dichloride at 25°–30°C. After the completion of the addition, pyridine hydrochloride was filtered from the reaction mixture. The nuclear magnetic resonance spectrum of the reaction mixture showed a singlet at 3.5 ppm (relative to tetramethylsilane) for the N-methyl group of the N-chlorothio-N-methyl-N'-3,4-dichlorophenyl urea product.

EXAMPLE 4

Preparation of N-chlorothio-N,N'-dimethyl urea

Pyridine, 9.48 g (0.12 mole) was added dropwise to a solution of 8.8 g (0.1 mole) N,N'-dimethyl urea and 11.3 g (0.11 mole) sulfur dichloride at 25°–30°C. Pyridine hydrochloride was then filtered from the reaction mixture to give a solution of the N-chlorothio urea product in methylene chloride. The nuclear magnetic resonance spectrum of the product showed a singlet at 3.5 ppm for the N-methyl group and a doublet at 2.95 ppm for the N'-methyl group.

UTILITY

The N-chlorothio urea compounds of the invention are useful intermediates for the preparation of pesticides. Useful pesticides are formed from the N-chlorothio urea compounds by more or less conventional substitution and addition reactions. Representative types of pesticides which can be prepared from the N-chlorothio urea compounds are illustrated below:

1. Preparation of Monothioperoxy Urea Compounds.

The N-chlorothio urea compounds react with alcohols to form monothioperoxy urea compounds. In terms of the N-chlorothio urea compounds represented by formula (I), the reaction can be depicted by the following equation (2).

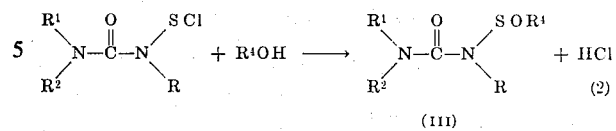

wherein $R^1$, $R^2$ and R have the same significance as previously defined and $R^4OH$ is an alcohol.

The reaction is carried out by the conventional methods employed for the reaction of sulfenyl halides and hydroxylic compounds, as disclosed by E. Kuhle, *Synthesis*, 617 (1971), the disclosure of which is herewith incorporated by reference.

The following example illustrates the preparation of a representative monothioperoxy urea compound. In the example 5, the monothioperoxy urea compounds are named as N-alkoxythio ureas.

EXAMPLE 5

Preparation of N-propoxythio-N-methyl-N'-3,4-dichlorphenyl urea [RE-17,027]

To a solution of about 0.1 mole of N-chlorothio-N-methyl-N'-3,4-dichlorophenyl urea in methylene dichloride, prepared as described in Example 3, was added dropwise a solution of 6 g (0.1 mole) n-propanol and 9.5 g (0.12 mole) pyridine in 20 ml of methylene chloride at 0°C. After the completion of the addition, the resulting reaction mixture was stirred in an ice bath for about 10 minutes, washed with water, washed with sodium bicarbonate solution, dried over magnesium sulfate and evaporated under reduced pressure to give 22.6 g of a dark oil residue. The oil residue was purified by column chromatography on silica gel (hexane/chloroform eluent) to give the product as a white, low melting solid (<25°C.). Elemental analysis showed:

|   | Calc. | Found |
|---|---|---|
| S % | 10.4 | 10.4 |
| C % | 23.0 | 22.8 |

By a similar procedure, the monothioperoxide compunds tabulated in Table I were prepared.

TABLE I

MONOTHIOPEROXY UREA COMPOUNDS

| COMPOUND | MELTING RANGE, °C. | Elemental Analysis | | | | | |
|---|---|---|---|---|---|---|---|
| | | S | | Cl | | N | |
| | | Calc. | Found | Calc. | Found | Calc. | Found |
| N-octoxythio-N-methyl-N'-(3,4-dichlorophenyl) urea | Oil | 8.1 | 8.1 | 18.1 | 17.3 | — | — |
| N-methoxythio-N-methyl-N'-(3,4-dichlorophenyl) urea | 72–77 | 11.4 | 11.8 | 25.3 | 25.8 | — | — |
| N-methoxythio-N-methyl-N'-(2-fluorophenyl) urea | Oil | 13.9 | 13.9 | 8.3 | 8.3 | — | — |
| N-norbornyloxythio-N-methyl-N'-(2-fluorophenyl) urea | Oil | 10.3 | 10.9 | 6.1 | 6.2 | — | — |
| N-ethoxythio-N-methyl-N'-(2-fluorophenyl) urea | oil | 13.1 | 13.6 | 7.8 | 7.9 | — | — |
| N-propoxythio-N-methyl-N'-(2-fluorophenyl) urea | Oil | — | — | — | — | 10.9 | 11.1 |

TABLE I -Continued

MONOTHIOPEROXY UREA COMPOUNDS

| COMPOUND | MELTING RANGE, °C. | Elemental Analysis | | | | | |
|---|---|---|---|---|---|---|---|
| | | S | | Cl | | N | |
| | | Calc. | Found | Calc. | Found | Calc. | Found |
| N-isopropoxythio-N-methyl-N'-(2-fluorophenyl) urea | Oil | — | — | — | — | 10.9 | 11.2 |
| N-ethoxythio-N-methyl-N'-(3,4-dichlorophenyl) urea | 60–61 | 10.9 | 10.9 | 24.1 | 24.0 | — | — |
| N-isopropoxythio-N-methyl-N'-(3,4-dichlorophenyl) urea | Oil | 10.4 | 10.7 | 23.0 | 23.2 | — | — |
| N-norbornyloxythio-N-methyl-N'-(3,4-dichlorophenyl) urea | Oil | 8.7 | 9.0 | 19.7 | 19.3 | — | — |
| N-cyclohexyloxythio-N-methyl-N'-(2-fluorophenyl) urea | 69–72 | 10.7 | 10.8 | 6.4 | 6.5 | — | — |

The monothioperoxy urea compounds are, in general, herbicidal in both pre- and post-emergence applications. For preemergence control of undesirable vegetation these ureas will be applied to herbicidal quantities to the environment, e.g., soil infested with seeds and/or seedlings of such vegetation. Such application will inhibit the growth of or kill the seeds, germinating seeds and seedlings. For post-emergence applications the monothioperoxy urea compounds will be applied directly to the foliage and other plant parts. Generally they are effective against weed grasses as well as broad-leaved weeds. Some may be selective with respect to type of application and/or type of weed.

Pre- and post-emergence herbicidal tests on the monothioperoxy urea compounds prepared above were made using the following methods:

Pre-Emergence Test

An acetone solution of the test urea compound was prepared by mixing 750 mg. urea, 220 mg. of a nonionic surfactant and 25 ml. of acetone. This solution was added to approximately 125 ml. of water containing 156 mg. of surfactant.

Seeds of the test vegetation were planted in a pot of soil and the urea solution was sprayed uniformly onto the soil surface at a dose of 100 micrograms per cm$^2$. The pot was watered and placed in a greenhouse. The pot was water intermittently and was observed for seedling emergence, health of emerging seedlings, etc. for a 3-week period. At the end of this period the herbicidal effectiveness of the urea was rated based on the physiological observations. A 0 to 100 scale was used; 0 representing no phytotoxicity, 100 representing complete kill.

Post-Emergence Test

The test urea was formulated in the same manner as described above for the pre-emergence test. The concentration of the urea in this formulation was 5,000 ppm. This formulation was uniformly sprayed on 2 replicate pots of 24-day-old plants (approximately 15 to 25 plants per pot) at a dose of 100 micrograms per cm$^2$. After the plants had dried, they were placed in a greenhouse and then watered intermittently at their bases as needed. The plants were observed periodically for phytotoxic effects and physiological and morphological responses to the treatment. After 3 weeks the herbicidal effectiveness of the urea was rated based on these observations. A 0 to 100 scale was used; 0 representing no phytotoxicity, 100 representing complete kill.

The results of these tests appear in Table II. In Table II, the following abbreviations are used:

O = Wild Oats (Avena fatua)
W = Watergrass (Echinochloa crusgalli)
C = Crabgrass (Digitaria sanguinalis)
M = Mustard (Brassica arvensis)
P = Pigweed (Amaranthus retroflexus)
L = Lambsquarter (Cheropodium album)

TABLE II

| COMPOUND | Herbicidal Effectiveness Pre/Post | | | | | |
|---|---|---|---|---|---|---|
| | O | W | C | M | P | L |
| N-propoxythio-N-methyl-N'-(3,4-dichlorophenyl urea | 98/100 | 98/100 | 95/80 | 100/100 | 100/100 | 100/100 |
| N-octoxythio-N-methyl-N'-(3,4-dichlorophenyl) urea | 40/93 | 85/100 | 93/93 | 90/100 | 100/100 | 100/100 |
| N-methoxythio-N-methyl-N'-(3,4-dichlorophenyl) urea | 95/100 | 100/100 | 100/85 | 100/100 | 100/100 | 100/100 |
| N-methoxythio-N-methyl-N'-(2-fluorophenyl) urea | 100/100 | 100/100 | 80/100 | 100/100 | 100/100 | 100/100 |
| N-norbornyloxythio-N-methyl-N'-(2-fluorophenyl) urea | 100/100 | 100/100 | 95/100 | 100/100 | 100/100 | 100/100 |
| N-ethoxythio-N-methyl-N'-(2-fluorophenyl) urea | 100/100 | 100/100 | 96/65 | 100/100 | 100/100 | 100/100 |
| N-propoxythio-N-methyl-N'-(2-fluorophenyl) urea | 100/100 | 100/100 | 90/70 | 100/100 | 100/100 | 100/100 |

TABLE II – Continued

| COMPOUND | Herbicidal Effectiveness Pre/Post | | | | | |
|---|---|---|---|---|---|---|
| | O | W | C | M | P | L |
| N-isopropoxythio-N-methyl-N'-(2-fluorophenyl) urea | 100/100 | 100/100 | 100/90 | 100/100 | 100/100 | 100/100 |
| N-ethoxythio-N-methyl-N'-(3,4-dichlorophenyl) urea | 75/90 | 100/100 | 100/85 | 100/100 | 100/100 | 100/100 |
| N-isopropoxythio-N-methyl-N'-(3,4-dichlorophenyl) urea | 90/100 | 100/100 | 100/90 | 100/100 | 100/100 | 100/100 |
| N-norbornyloxythio-N-methyl-N'-(3,4-dichlorophenyl) urea | 45/100 | 100/100 | 95/95 | 100/100 | 100/100 | 100/100 |
| N-cyclohexyloxythio-N-methyl-N'-(2-fluorophenyl) urea | 100/100 | 100/100 | 100/100 | 100/100 | 100/100 | 100/100 |

2. Preparation of Urea Disulfides

The N-chlorothio urea compounds react with sodium iodide to produce bis-urea disulfides of the formula (IV):

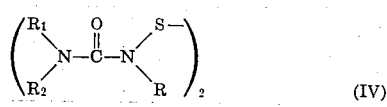

wherein $R^1$, $R^2$ and R have the same significance as previously defined.

The preparation of a representative bis-urea disulfide is illustrated in the following example.

EXAMPLE 6

Bis-[3-(2-fluorophenyl)-1-methyl-1-ureido]-disulfide.

A solution of N-chlorothio-N-methyl-N'-2-fluorophenyl urea in 150 ml methylene dichloride was prepared from 25.2 g (0.15 mole) N-methyl-N'-2-fluorophenyl urea, 17 g (0.16 mole) sulfur dichloride and 14.2 g (0.18 mole) pyridine by a procedure identical to that of Example 1. To the solution of N-chlorothio-N-methyl-N'-2-fluorophenyl urea was then added dropwise a solution of 22 g (0.15 mole) sodium iodide in 45 ml water cooled to about 0°C. in a dry ice-/acetone bath. After the addition was completed, the reaction mixture was stirred at 0°C. for about 10–15 minutes. The methylene dichloride layer was separated, washed with sodium thiosulfate solution, washed with sodium bicarbonate solution, washed with water, dried over magnesium sulfate and evaporated under reduced pressure to give 20.2 g of the crude disulfide product as a yellow oil. The crude product was purified by column chromatography on silica (benzene elution) and crystallized from ether-hexane to give a white solid, m.p., 87°–93°C. Elemental analysis showed:

| | Calc. | Found |
|---|---|---|
| % C | 48.2 | 47.6 |
| % H | 4.0 | 3.9 |
| % N | 14.1 | 13.5 |
| % S | 16.1 | 16.6 |

The urea disulfide product was effective as a herbicide for grass and broadleaved weeds.

3. Preparation of N-Dithio Ureas

The N-chlorothio urea compounds react with mercaptans to form dithio substituted ureas. In terms of the N-chlorothio urea compounds of formula (I), the reaction can be depicted by the following equation (3):

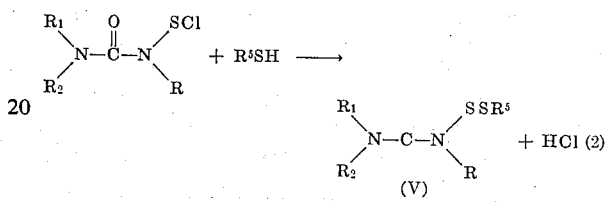

wherein $R^1$, $R^2$ and R have the same significance as previously defined and $R^5SH$ is a mercaptan reactant.

The reaction is carried out by the conventional procedures employed for the reaction sulfenyl halides and mercaptan compounds, as disclosed by E. Kuhle, *Synthesis*, 617 (1971).

Dithio substituted ureas of formula (V) are claimed in applicants' copending application, U.S. Ser. No. 88,106, filed Nov. 9, 1970. The preparation of representative dithio substituted ureas is illustrated in the following examples.

EXAMPLE 7:

N-methyl-N-ethyldithio-N'-(3,4-dichlorophenyl) urea

A 9 48 g (0.12 mole) sample of pyridine was added dropwise to a slurry of 21.9 g (0.09 mole) N-methyl-N-'-(3,4-dichlorophenyl) urea and 10.3 g (0.1 mole) sulfur dichloride in 100 ml methylene dichloride at 25°–30°C. After the addition was completed, the reaction mixture was stirred for 20 minutes and filtered to give a solution of the chlorothio urea product in methylene dichloride. To the chlorothio urea solution was then added dropwise a solution of 6.2 g ethyl mercaptan and 9.48 g pyridine in 20 ml methylene dichloride at 0°C. After the addition was completed, the reaction mixture was stirred at 0°C. for 10 minutes, washed with water, washed with sodium bicarbonate solution, diluted with benzene and filtered. The filtrate was dried over magnesium sulfate, filtered and evaporated under reduced pressure to give a solid product. The solid product was recrystallized from ether-hexane to give the urea disulfide product, m.p., 108°–109°C. Elemental analysis showed:

| | Calc. | Found |
|---|---|---|
| S % | 20.6 | 20.2 |
| Cl % | 22.8 | 23.1 |

By a similar procedure the urea disulfides tabulated in Table III were prepared.

By a procedure identical to that employed for the monothioperoxy urea compounds of Example 5, the urea disulfides were tested as pre- and post-emergence herbicides. The results are tabulated in Table IV.

TABLE III

| COMPOUND | MELTING RANGE, °C. | Elemental Analysis | | | |
|---|---|---|---|---|---|
| | | S Calc. | S Found | N Calc. | N Found |
| N-methyl-N-propyldithio-N'-(3,4-dichlorophenyl) urea | 79 | 19.7 | 19.6 | 21.9 | 21.9 |
| N-methyl-N-methyldithio-N'-(3,4-dichlorophenyl) urea | 93.5–95 | 21.6 | 21.5 | 23.9 | 24.0 |
| N-methyl-N-isopropyldithio-N'-(3,4-dichlorophenyl) urea | 103.5–106 | 19.7 | 19.5 | 21.9 | 22.6 |
| N-methyl-N-n-butyldithio-N'-(3,4-dichlorophenyl) urea | 68–68.5 | 18.9 | 19.0 | 20.9 | 21.0 |
| N-methyl-N-cyclohexyldithio-N'-(3,4-dichlorophenyl) urea | 97.5–102 | 17.5 | 16.1 | 19.5 | 19.6 |
| N-methyl-N-p-chloro-benzyldithio-N'-(3,4-dichlorophenyl) urea | 98–103 | 15.7 | 14.2 | 26.1 | 26.2 |
| N-methyl-N-cyclohexylthio-N'-(3,4-dichlorophenyl) urea | 40–42 | 20.4 | 19.2 | 8.9 | 9.2 |
| N-methyl-N-propyldithio-N'-(3-chloro-4-bromophenyl) urea | 80–83 | 17.3 | 16.9 | 5.4* | 5.6* |
| N-methyl-N-n-butyldithio-N'-(3,4-dichlorophenyl) urea | 64–66 | 16.7 | 15.6 | 5.2* | 5.4* |
| N-methyl-N-methyldithio-N'-(3,4-dichlorophenyl) urea | 99–99.8 | 18.7 | 18.6 | 5.9* | 6.0* |
| N-methyl-N-methyldiothio-N'-(2-fluorophenyl) urea | Oil | 26.0 | 24.3 | 7.7** | 7.4** |
| N-methyl-N-phenyldithio-N'-methyl urea | 63–64 | 28.1 | 28.0 | — | — |

*Total halogen analysis
**Fluorine analysis

TABLE IV

| COMPOUND | Herbicidal Effectiveness Pre/Post | | | | | |
|---|---|---|---|---|---|---|
| | O | W | C | M | P | L |
| N-methyl-N-ethyldithio-N'-(3,4-dichlorophenyl) urea | 25/98 | 50/78 | 95/45 | 100/100 | 75/100 | 98/100 |
| N-methyl-N-propyldithio-N'-(3,4-dichlorophenyl) urea | 80/100 | 87/100 | 93/100 | 100/100 | 98/100 | 100/100 |
| N-methyl-N-methyldithio-N'-(3,4-dichlorophenyl) urea | 35/87 | 35/60 | 55/40 | 100/100 | 100/100 | 100/100 |
| N-methyl-N-isopropyldithio-N'-(3,4-dichlorophenyl) urea | 30/70 | 50/75 | 87/98 | 100/100 | 95/100 | 95/100 |
| N-methyl-N-n-butyldithio-N'-(3,4-dichlorophenyl) urea | 45/100 | 70/100 | 93/100 | 95/100 | 95/100 | 98/100 |
| N-methyl-N-cyclohexyldithio-N'-(3,4-dichlorophenyl) urea | 20/35 | 50/35 | 100/70 | 100/100 | 100/100 | 09— /100 |
| N-methyl-N-p-chlorobenzyldithio-N'-(3,4-dichlorophenyl) urea | 20/30 | 70/45 | 100/70 | 100/100 | 100/100 | 100/100 |
| N-methyl-N-cyclohexylthio-N'-(3,4-dichlorophenyl) urea | 95/100 | 100/100 | 100/100 | 100/100 | 100/100 | 100/100 |
| N-methyl-N-propyldithio-N'-(3,4-dichlorophenyl) urea | 0/50 | 0/55 | 0/70 | 10/90 | 10/100 | 10/100 |
| N-methyl-N-n-butyldithio-N'-(3,4-dichlorophenyl) urea | 0/55 | 0/65 | 0/65 | 0/100 | 0/100 | 180/100 |

Table IV—Continued

| COMPOUND | Herbicidal Effectiveness Pre/Post | | | | | |
|---|---|---|---|---|---|---|
| | O | W | C | M | P | L |
| N-methyl-N-methyldithio-N'-(3,4-dichlorophenyl) urea | 0/100 | 0/85 | 0/85 | 100/100 | 85/100 | 100/100 |
| N-methyl-N-methyldithio-N'-(2-fluorophenyl) urea | 100/100 | 100/100 | 100/70 | 100/100 | 100/95 | 100/100 |

4. Preparation of Bis-Urea Sulfides

The N-chlorothio urea compounds react with urea compounds having at least one hydrogen substitutent on a urea nitrogen to form bis-urea sulfides. In terms the N-chlorothio urea compounds of formula (I), the reaction can be depicted by the following equation (4):

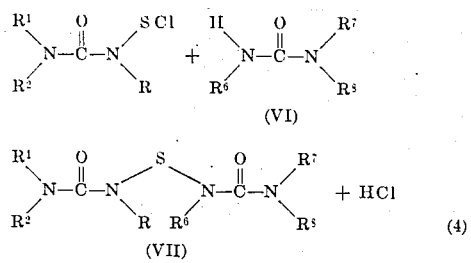

(VI)

(VII)

wherein $R^1$, $R^2$ and R are as previously defined and $R^6$, $R^7$ and $R^8$ are independently $R^1$, $R^2$ or $R^3$ groups.

The bis-urea sulfides of formula (VII) are claimed in applicants' copending application, U.S. Ser. No. 88,212, filed Nov. 9, 1970.

The preparation of representative bis-urea sulfides is illustrated by the following examples.

EXAMPLE 8

[3-(2-fluorophenyl)-1-methyl-1-ureido]-[3',3'-dimethyl-1'-(3,4-dichlorophenyl)-1'-ureido] sulfide A solution of about 0.05 mole 1-chlorothio-1-methyl-3-(2-fluorophenyl) urea in methylene chloride was added dropwise to 11.65 g (0.05 mole) 3,3-dimethyl-1-(3,4-dichlorophenyl) urea and 4.74 g (0.06 mole) pyridine in 50 ml methylene dichloride. After the addition was completed, the reaction was stirred for 3 hours at about 25°C. and allowed to stand overnight. The reaction mixture was then washed with water, washed with sodium bicarbonate, washed twice with water, dried over magnesium sulfate and evaporated to give a yellow oil. The yellow oil was crystallized from hot ethanol to give the bis-urea sulfide product, m.p., 149.5°–150.5°C. Standard analysis gave:

| | Calc. | Found |
|---|---|---|
| C % | 47.3 | 49.7 |
| H % | 3.9 | 3.8 |
| N % | 13.0 | 13.0 |
| S % | 7.4 | 7.5 |
| Cl % | 16.5 | 16.9 |

EXAMPLE 9:

[3-(3,4-dichlorophenyl)-1-methyl-1-ureido]-[3',3'-dimethyl-1'-(3,4-dichlorophenyl)-1'-ureido] sulfide A solution of 1-chlorothio-1-methyl-3-(3,4-dichlorophenyl) urea was prepared from 12 g (0.055 mole) of 1-methyl-3-(3,4-dichlorophenyl) urea, 6.28 g (0.061 mole) sulfur dichloride and 5.22 g (0.066 mole) pyridine in 55 ml methylene dichloride by a procedure identical to that of Example 3. The solution of chlorothio urea was added dropwise to a slurry of 11.7 g (0.05 mole) 3,3-dimethyl-1-(3,4-dichlorophenyl) urea and 3.95 g (0.05 mole) pyridine at about 25°C. and the resulting reaction mixture was stirred at about 25°C. for 2½ hours. The reaction mixture was then washed with water, washed with sodium bicarbonate solution, washed with water, dried over magnesium sulfate and evaporated under reduced pressure to give a yellow oil. The yellow oil was slurried in benzene and filtered. The filtrate was then washed through a column of silica and evaporated to give a thick oil which crystallized from ether-hexane as a white solid. Recrystallization of the white solid from isopropanol gave the bis-urea sulfide product, m.p., 145°–149°C. Elemental analysis gave:

| | Calc. | Found |
|---|---|---|
| S % | 6.6 | 6.7 |
| Cl % | 29.4 | 30.0 |

The bis-urea sulfides were tested as herbicides by the procedure used in Example 5. The results are tabulated in Table V.

TABLE V

| COMPOUND | Herbicidal Effectiveness Pre/Post | | | | | |
|---|---|---|---|---|---|---|
| | O | W | C | M | P | L |
| [3-(2-fluorophenyl)-1-methyl-1-ureido]-[3,3-dimethyl-1-(3,4-dichlorophenyl)-1-ureido]-sulfide | 100/95 | 100/95 | 100/95 | 100/100 | 100/100 | 100/100 |
| [3-(3,4-dichlorophenyl)-1-methyl-1-ureido]-[3,3-dimethyl-1-(3,4-dichlorophenyl)-1-ureido]-sulfide | 98/100 | 100/100 | 98/73 | 100/100 | 100/100 | 100/100 |

5. Preparation of Urea Carbamoyl Sulfides

The N-chlorotio urea compounds react with carbamates have at least one hydrogen substituent on a carbamate nitrogen atom according to the following equation (5):

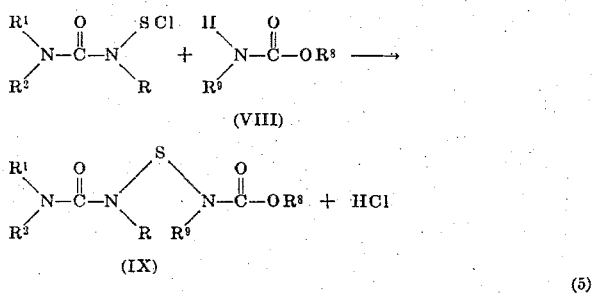

(5)

wherein $R^1$, $R^2$ and R have the same significance as previously defined and $R^8$ is an organo $R^1$, $R^2$ or R groups and $R^9$ is hydrogen or an organo $R^1$, $R^2$ or R group.

Urea carbamoyl sulfides of formula (IX) are disclosed and claimed in applicants' copending application, U.S. Ser. No. 189,732, filed Nov. 15, 1971.

The reaction is conducted by the conventional methods generally employed for the reaction of sulfenyl halides and active proton-containing compounds. The preparation of a representative compound is illustrated in the following example:

EXAMPLE 10

(1-methyl-3-(3,4-dichlorophenyl-1-ureido)1-(α-naphthyl-N-methylcarbamoyl)-sulfide.

A solution of 0.05 mole of 1-chlorothio-1-methyl-3-(3,4-dichlorophenyl) urea in 50 ml of methylene chloride was prepared by a procedure identical to that of Example 3. 1-Naphthyl-N-methyl carbamate, 8.3 g (0.04 mole) was added portionwise to the chlorothio urea at room temperature. Pyridine, 3.9 g (0.05 mole) was added and the reaction stored overnight at room temperature. The reaction was washed with water, washed with sodium bicarbonate, dried over magnesium sulfate, and evaporated under reduced pressure to give a brown oil. The oil was slurried with ether to precipitate a white solid. Recrystallization from chloroform/hexane gave the product, m.p. 123°–24.5°C. Elemental analysis showed:

|  | Calc. | Found |
|---|---|---|
| S % | 7.11 | 7.4 |
| Cl % | 15.8 | 15.8 |

The urea-carbamoyl sulfide product was tested as a herbicide by the procedure employed in Example 5. The results are tabulated in Table VI.

6. Preparation of Aminothio Ureas

The N-chlorothio urea compounds react with primary and secondary amines and anilines to produce aminothio-substituted ureas according to the following equation (6):

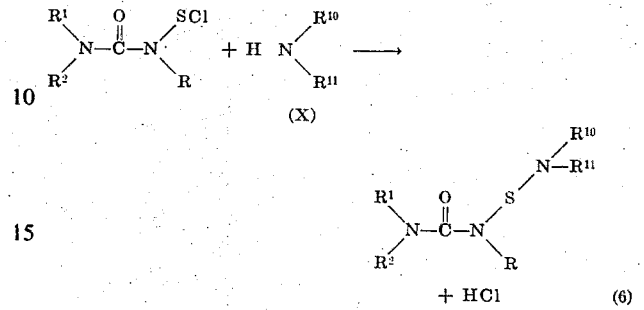

(6)

wherein $R^1$, $R^2$ and R have the same significance as previously defined and $R^{10}$ is an organo $R^1$, $R^2$ or R group and $R^{11}$ is hydrogen or $R^{10}$.

The preparation of a representative aminothio urea is illustrated by the following example:

EXAMPLE 11

N-(3,4-dichlorophenylaminothio)-N-methyl-N'-(3,4-dichlorophenyl) urea

N-chlorothio-N-methyl-N'-(3,4-dichlorophenyl) urea (0.1 mole) in 100 ml methylene chloride was prepared in a manner identical to Example 3. 3,4- Dichloroaniline, 14.5 g (0.09 mole) and pyridine, 9.5 g (0.09 mole) in 20 ml methylene chloride was added to the chlorothio urea at 0°C. The reaction was stirred 30 minutes at 0°C. after the addition was completed. The resulting reaction solution was washed with water, washed with sodium bicarbonate, dried over magnesium sulfate, and evaporated under reduced pressure to yield an oil. Crystallization from chloroform gave a white solid, m.p. 142°–145°C. Elemental analysis showed:

|  | Calc. | Found |
|---|---|---|
| S % | 7.8 | 8.0 |
| Cl % | 34.6 | 34.3 |

The product was tested as a pre- and post-emergence herbicide as described heretofore and found to be effective for the control of grass and broad-leaved weeds.

7. Addition to Olefins

The N-chlorothio urea compounds add to olefins to form the corresponding 1,2-addition product as depicted in the following equation for addition to cyclohexane.

TABLE VI

| | Herbicidal Effectiveness | | | | | |
|---|---|---|---|---|---|---|
| COMPOUND | O | W | C | Pre/Post M | P | L |
| [1-methyl-3-(3,4-dichlorophenyl)-1-ureido]-(α-naphthyl-N-methylcarbamoyl) sulfide | 20/45 | 25/70 | 80/65 | 100/100 | 100/100 | 100/100 |

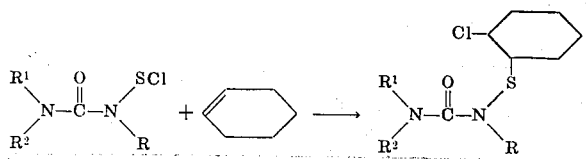

wherein $R^1$, $R^2$ and R have the same significance as previously defined.

The invention is conducted by conventional procedures, e.g., by the contacting of an olefin and the N-chlorothio urea in an inert solvent at moderate temperatures, e.g., 0° to 50°C.

The products resulting from the addition of an N-chlorothio urea to cycloalkenes of five to 12 carbon atoms or norbornene are known and are disclosed in U.S. Ser. No. 54,855 of Kobzina et al., filed July 14, 1970, common assignee. The disclosure of U.S. Ser. No. 54,855 is herewith incorporated by reference.

The preparation of a representative olefin addition product is illustrated by the following example:

EXAMPLE 12

N-methyl-N-(2-chlorocyclohexylthio)-N'-(2-fluorophenyl) urea

A 569 g (7.2 mole) sample of pyridine was added over a period of 18 minutes to a mixture of 1,008 g (6 mole) of N-methy-N'-(2-fluorophenyl) urea and 680 g (6.6 mole) sulfur dichloride in 6 ml methylene dichloride cooled to below 30°C. with a dry ice/acetone bath. After the addition was completed, the pyridine hydrochloride salt was filtered. A 443 g (5.4 mole) sample of cyclohexene was then added to the resulting filtrate cooled to 0°C. with a dry ice/acetone bath. After 15 minutes of stirring, the resulting reaction mixture was washed with water, sodium bicarbonate solutin, dried over magnesium sulfate and evaporated under reduced pressure to give 1.7 kg of urea product as a yellow oil.

8. Additional N-Chlorothio Urea Derivatives

The reaction of the N-chlorothio ureas with N-alkylanilides, thio-substituted carboxylic acid esters, and compounds having two active-hydrogen functional groups such as alkanes having two mercapto groups, two hydroxyl group, two amino groups, or two different amino, mercapto or hydroxyl groups, is illustrated by the following examples:

EXAMPLE 13

Preparation of
N-methyl-N-(N''-phenyl-N''-propionoylaminothio)-N'-(3,4-dichlorophenyl) urea N-chlorothio-N-methyl-N'-(3,4-dichlorophenyl) urea (0.1 mole) in 100 ml methylene chloride was prepared in a manner identical to Example 3. 3,4-Dichlorophenyl-n-propanilide, 19.6 g (0.09 mole) and pyridine, 7.9 g (0.1 mole) were added to the chlorothio urea and the reaction stirred overnight. The resulting mixture was washed with water, washed with sodium bicarbonate, dried over magnesium sulfate, and evaporated under reduced pressure to give a gray solid. Recrystallization from chloroform hexane gave the product. m.p. 149°–152°C. Elemental analysis showed:

|   |   | Calc. | Found |
|---|---|-------|-------|
| S | % | 6.9   | 7.0   |
| Cl| % | 30.4  | 30.5  |

The product was tested as a pre- and post-emergence herbicide as described heretofore and found to be effective for the control of grass and broad-leaved weeds.

EXAMPLE 14

The 1,2-ethane-bis-urea disulfide of the formula:

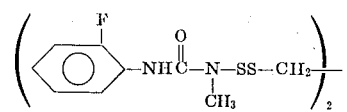

was prepared as follows:

N-chlorothio-N-methyl-N-2-fluorophenyl urea (0.1 mole) in 100 ml methylene chloride was prepared in a manner identical to Example 3. 1,2-ethanedithiol, 4.2 g (0.045 mole) and pyridine, 7.9 g (0.1 mole) dissolved in 20 ml methylene chloride were added to the chlorothio urea at 0°C. and the mixture stirred ten minutes following the addition. The reaction was then washed with water, washed with sodium bicarbonate, dried over magnesium sulfate, and evaporated under reduced pressure to yield a white solid. The solid was washed with ether and hexane to give the product, m.p. 92.5°–95°C. Elemental analysis showed:

|   |   | Calc. | Found |
|---|---|-------|-------|
| S | % | 26.1  | 25.3  |
| F | % | 7.8   | 8.0   |

The product was effective as a pre- and post-emergence herbicide for grass and broad-leaved weeds.

EXAMPLE 15

Preparation of
N-(2-carbomethoxyethyldithio)-N-methyl-N'-(3,4-dichlorophenyl) urea N-chlorothio-N-methyl-N'-(3,4-dichlorophenyl) urea (0.1 mole) in 100 ml methylene chloride was prepared in a manner identical to Example 3. Methyl-3-mercaptopropionate (0.09 mole) and pyridine, 7.9 g (0.1 mole) dissolved in 10 ml methylene chloride was added to the chlorothio urea at 0°C. The reaction was stirred 10 minutes after the addition was completed and the mixture was washed with water, washed with sodium bicarbonate, dried over magnesium sulfate and evaporated under reduced pressure to yield an oil. Chromatography over silica gel (benzene eluent) yielded the product, a dark gray oil. Elemental analysis showed:

|   |   | Calc. | Found |
|---|---|-------|-------|
| S | % | 17.3  | 17.2  |
| Cl| % | 19.2  | 19.6  |

By a similar procedure the urea compounds tabulated in Table VII were prepared. The pre- and post-emergence herbicidal test results for these compounds are tabulated in Table VIII.

TABLE VII

| COMPOUND | MELTING RANGE °C. | Elemental Analysis | | | |
|---|---|---|---|---|---|
| | | S Calc. | Found | Halogen Calc. | Found |
| N-(2-carbomethoxyethyldithio)-N-methyl-N'-(3,4-dichlorophenyl) urea | Oil | 17.3 | 17.2 | 19.2 | 19.8 (Cl) |
| N-(carbomethoxymethyldithio)-N-methyl-N'-(3,4-dichlorophenyl) urea | 94.5–95.5 | 18.0 | 17.6 | 20.0 | 20.0 (Cl) |
| N-(carbethoxymethyldithio)-N-methyl-N'-(3,4-dichlorophenyl) urea | 82–83 | 17.3 | 16.6 | 19.2 | 18.5 (Cl) |
| N-(carbomethoxymethyldithio)-N-methyl-N'-(3-chloro-4-bromophenyl) urea | 96–97.5 | 16.0 | 15.7 | 5.0 | 5.1 (Br,Cl) |
| N-(2-carbomethoxyethyldithio)-N-methyl-N'-(2-fluorophenyl) urea | 51–52.5 | 8.8 | 9.0 (Nitrogen) | — | — |
| N-(carbomethyoxymethyldithio)-N-methyl-N'-(2-fluorophenyl) urea | Oil | 21.1 | 21.2 | 6.3 | 6.2 (F) |
| N-(2-carbomethoxyethyldithio)-N-methyl-N'-(3-chloro-4-bromophenyl) urea | Oil | 15.5 | 15.2 | 4.8 | 4.8 (Br,Cl) |
| N-(carbethoxymethyldithio)-N-methyl-N'-(3-chloro-4-bromophenyl) urea | 88.5–91.5 | 15.5 | 15.4 | 4.8 | 4.9 (Br,Cl) |

TABLE VIII

| COMPOUND | Herbicidal Effectiveness Pre/Post | | | | | |
|---|---|---|---|---|---|---|
| | O | W | C | M | P | L |
| N-(2-carbomethoxyethyldithio)-N-methyl-N'-(3,4-dichlorophenyl) urea | 45/70 | 100/75 | 90/85 | 100/100 | 100/100 | 100/100 |
| N-(carbomethoxymethyldithio)-N-methyl-N'-(3,4-dichlorophenyl) urea | 95/99 | 100/98 | 100/75 | 100/100 | 100/100 | 100/100 |
| N-(carbethoxymethyldithio)-N-methyl-N'-(3,4-dichlorophenyl) urea | 100/95 | 100/100 | 100/100 | 100/100 | 100/100 | 100/100 |
| N(carbomethoxymethylidithio)-N-methyl-N'-(3-chloro-4-bromophenyl) urea | 55/95 | 80/95 | 85/100 | 90/100 | 100/100 | 100/100 |
| N-(2-carbomethoxyethyldithio)-N-methyl-N'-(2-fluorophenyl) urea | 100/100 | 100/95 | 100/90 | 100/100 | 100/100 | 100/100 |
| N-(carbomethoxymethyldithio)-N-methyl-N'-(2-fluorophenyl) urea | 95/100 | 100/100 | 100/100 | 100/100 | 100/100 | 100/100 |
| N-(2-carbomethoxyethyldithio)-N-methyl-N'-(3-chloro-4-bromophenyl) urea | 40/95 | 100/60 | 100/80 | 100/100 | 100/100 | 100/100 |
| N-(carbethoxymethyldithio)-N-methyl-N'-(3-chloro-4-bromophenyl) urea | 60/100 | 100/75 | 100/100 | 100/100 | 100/100 | 100/100 |

O = Wild Oats (*Avena fatua*)
W = Watergrass (*Echinochloa crusgalli*)
C = Crabgrass (*Digitaria sanguinalis*)
M = Mustard (*Brassica arvensis*)
P = Pigweed (*Amaranthus retroflexus*)
L = Lambsquarter (*Chenopodium album*)

I claim:
1. N-chlorothio-N-methyl-N'-2-fluorophenyl urea.
2. N-chlorothio-N-methyl-N'-3,4-dichlorophenyl urea.

* * * * *

PO-1050
(5/69)

UNITED STATES PATENT OFFICE
CERTIFICATE OF CORRECTION

Patent No. 3,853,966           Dated December 10, 1974

Inventor(s) MELANCTHON S. BROWN, deceased, and GUSTAVE K. KOHN

It is certified that error appears in the above-identified patent and that said Letters Patent are hereby corrected as shown below:

Page 1, column 1, line 5, after "administrator"

insert --and Gustave K. Kohn, Berkeley, California.--

Signed and sealed this 24th day of June 1975.

(SEAL)
Attest:

RUTH C. MASON
Attesting Officer

C. MARSHALL DANN
Commissioner of Patents
and Trademarks